UNITED STATES PATENT OFFICE.

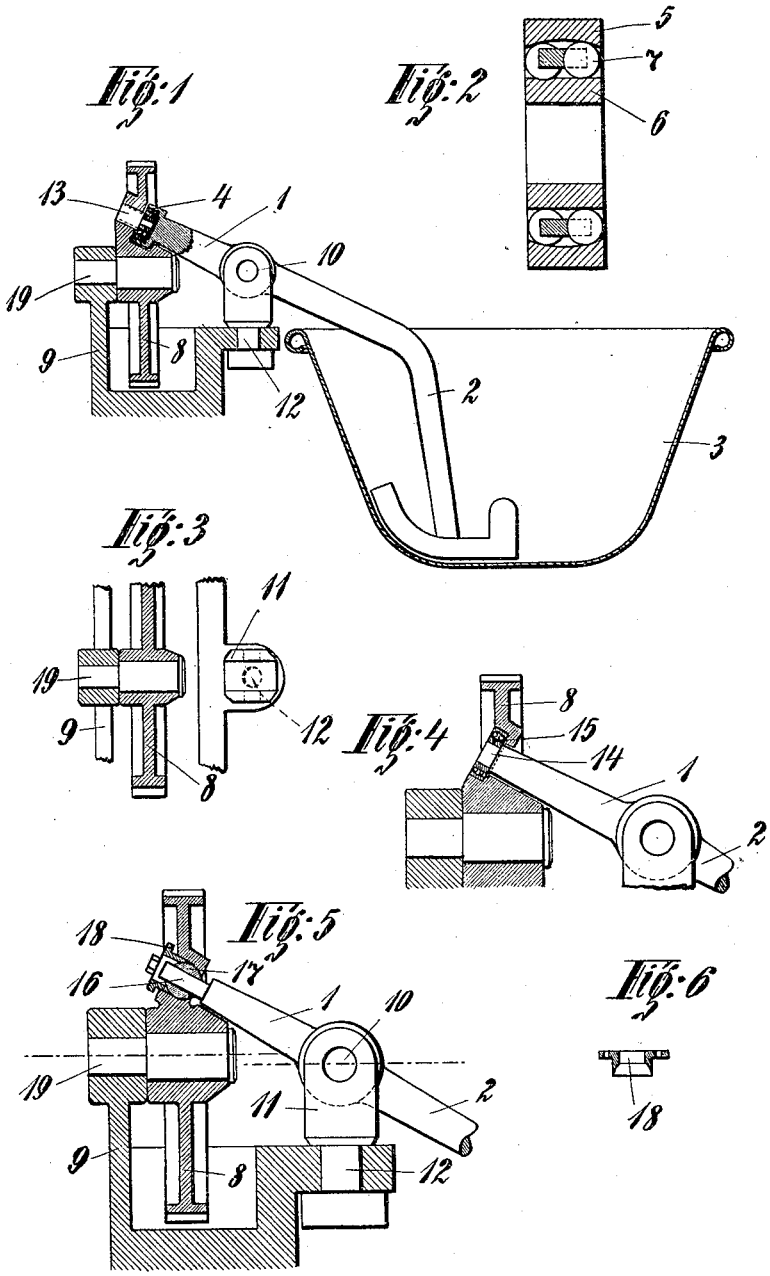

RICHARD HERBST, OF HALLE-ON-THE-SAALE, GERMANY.

MIXING AND KNEADING MACHINE.

1,138,654.   Specification of Letters Patent.   Patented May 11, 1915.

Application filed July 2, 1913. Serial No. 777,113.

*To all whom it may concern:*

Be it known that I, RICHARD HERBST, engineer, a citizen of the German Empire, residing at Halle-on-the-Saale, Germany, have invented certain new and useful Improvements in Mixing and Kneading Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to a mixing and kneading machine, in which the kneading arm is adapted to swing about a swivel joint and the driven end of said kneading arm is moved by a rotating part, for example, by a crank or wheel.

The invention consists essentially in providing a ball bearing for actuating the end of said arm, which can be carried out in various manners.

On the drawing Figure 1 shows a vertical section through the trough and the bearing of the kneading arm. Fig. 2 shows a radial ball bearing on an enlarged scale. Fig. 3 is a horizontal section of the bearing of the pin 19 and a plan of the swivel joint 11. Figs. 4 and 5 are sections through other construction of the driving part. Fig. 6 is a detail.

In Fig. 1 the trough is designated by 3. Into this trough projects a bent arm 2. 9 is a part of the frame of the machine, to which the swivel joint 11 is attached, which is adapted to turn about a pin 12. This joint 11 has a forked shaped part and carries a horizontal pin 10, about which the lever arm 2 turns in a vertical plane.

The driving end 1 of the kneading lever is provided with an eye 4, which, as evident from Fig. 2, surrounds a ball bearing, which consists of the outer ring 5, the inside ring 6 and the balls 7. Into the inside ring 6 projects a pin 13, which is fixed by screwing or other means to the toothed wheel 8, which can however be replaced by a crank. The wheel 8 is mounted on a pin 19 carried by the casing 9 and can be driven by any suitable driving mechanism, for example, by spur-wheels engaging in the wheel 8, or belts or the like may be used for the purpose. When the spur-wheel 8 rotates the lever 1, 2, describes a vertical movement and at the same time, the swivel joint 11 turns about the pin 12. The bent end of the lever 2 describes a curve and kneads the dough or mixes the materials.

In Fig. 3 a part of the frame 9 and spurwheel 8 is shown in section, the swivel joint 11 being shown in plan.

Fig. 4 represents another construction of the driving mechanism. The lever arm 1 is provided with a pin 14 on which the inner ring 15 of the ball bearing sits, which may be constructed in accordance with Fig. 2. The outside ring of the ball bearing is surrounded by an inclined boring in the spurwheel 8.

As shown by Fig. 2 the outer ring 5 has a curved inside surface. The construction of this ball bearing is of great importance for the easy construction and also for the operation of the machine, because it is difficult to bring the axis of the pin 13 in a mathematical line with the axis of the lever 1. The same difficulties are encountered in connection with the axis of the inclined boring in the wheel 8 of Fig. 4 and the axis of the lever 1. When using such a radial ball bearing as is shown in Fig. 2 it is possible to arrange the axis of the pin 10 outside of the axis of the pin 19 (compare Fig. 5 as well), which would not be possible if the ball bearing were not used.

Instead of providing the outer ring 5 with a curved surface, the inside ring can have such a surface, or both rings may have a cylindrical surface at the point where they come into contact with the balls if the outer surface of the ring 5 is curved, in which case however the opening in the eye 4 according to Fig. 1 or in the spurwheel 8 according to Fig. 4 is cut out in the same way. In this case also the ball bearing can carry out the automatic swinging movements, so that it is not necessary for the various axes to be in a mathematical line.

In Fig. 5 a further construction is shown in which the lever 1 has a cylindrical pin 16, which is surrounded by a ball. This ball rests in a ball shaped recess in the toothed wheel 8 and can be held by a sleeve 18 or the like, as shown in Fig. 6. The sleeve 18 is secured to the toothed wheel 8 by screws. Other suitable means can be adopted for securing the ball in position. The pin 16 is constructed in such a manner, that it can be moved longitudinally in the cylindrical hole in the ball 17. Fig. 5 indicates how in this case the axes of the shafts 19 and pin 10 can be displaced in regard to each other.

The trough 3 can either be rotated automatically by the lever 2 through the agency of the dough or it can be driven by special means. In the latter case the lower part of the frame 9 must be correspondingly formed. The trough can be arranged on a special carriage, so that it can be rolled onto the foundation plate of the frame 9.

The described ball bearing for driving the kneading lever has the great advantage that power is saved. Ordinary ball bearings may be used if desired, but the use of the socalled radial ball bearings, which themselves rotate, has the above mentioned advantages. By displacing the middle axis according to Fig. 5 it is possible to give the kneading lever differential curved movements, so that these movements can be well adapted to the inside surface of the trough.

What I claim and desire to secure by Letters Patent of the United States is:—

1. A mixing and kneading machine comprising, a kneading lever having a downwardly bent end portion, a horizontal rotatable member in which the lever is fulcrumed, a rotatable driving member, a radial ball bearing permitting universal movement connecting the lever and driving member and adapted to move relatively to the latter to permit the fulcrum point of the lever to be moved relatively to the axis of rotation of the driving member whereby differential curved movements may be imparted to the lever.

2. A mixing or kneading machine comprising a kneading lever having a downwardly bent end portion, a forked member rotatably mounted in the machine frame and forming a fulcrum for the lever, a ball bearing comprising concentric rings movably mounted in a socket formed in the power end of the levers, balls interposed between said rings, a rotatable driving member, and an inclined pin carried by the latter projecting into the inner ring of the ball bearing.

In testimony that I claim the foregoing as my invention, I have signed my name in presence of two subscribing witnesses.

RICHARD HERBST.

Witnesses:
RUDOLPH FRICKE,
DORIS KRAHL.